United States Patent [19]

Boeckmann

[11] Patent Number: 4,529,845

[45] Date of Patent: Jul. 16, 1985

[54] OPTICAL COUPLING INTERFACE CIRCUIT FOR TELEPHONE LINE RINGING SIGNAL INDICATION OR DETECTION

[75] Inventor: Eduard F. B. Boeckmann, Huntsville, Ala.

[73] Assignee: Gte Communication Systems Corporation, Northlake, Ill.

[21] Appl. No.: 596,174

[22] Filed: Apr. 2, 1984

[51] Int. Cl.³ .................................................. H04M 1/26
[52] U.S. Cl. ................................. 179/84 L; 179/84 R
[58] Field of Search ................ 179/84 R, 84 T, 84 L, 179/84 A

[56] References Cited

U.S. PATENT DOCUMENTS 3,842,216  10/1974  Owen et al. ...................... 179/84 L
4,063,045  12/1977  Greischar ........................... 179/84 R
4,066,848  1/1978   Darwood ........................... 179/84 R Primary Examiner—Gene Z. Rubinson
Assistant Examiner—James L. Dwyer
Attorney, Agent, or Firm—Robert J. Black; Gregory G. Hendricks

[57] ABSTRACT

An interface circuit for use with a telephone or PABX system or as a device applied to a subscriber's telephone line, that detects ringing voltage signals and either indicates the ringing condition visually or optically couples a detection signal to other annunciator or control devices such as microprocessors. The device conforms to the requirements and limitations for application of a device to the public telephone system. This device does not respond or interfere with voice or data signals nor address signaling.

9 Claims, 1 Drawing Figure

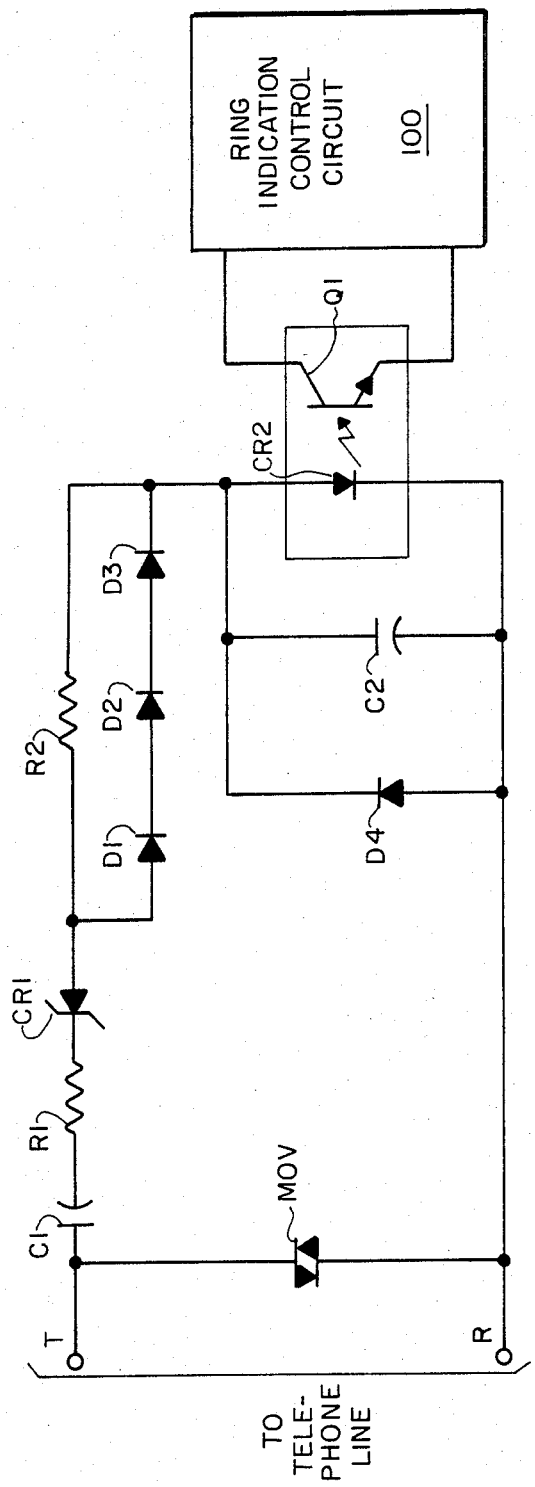

OPTICAL COUPLING INTERFACE CIRCUIT FOR TELEPHONE LINE RINGING SIGNAL INDICATION OR DETECTION

BACKGROUND OF THE INVENTION

1. Field of the Invention

The present invention relates to ringing signal detection and indication in telephone circuits and more particularly to an optically isolated ring detection interface circuit for use in a subscriber's telephone instrument on a subscriber's telephone line or on a telephone line where signal ring indication or optically isolated ring detection is required.

2. Background Art

Since the development of electronic telephone circuits employing active gain components, a variety of circuits have been developed for use in detection and indication of ringing voltage on a telephone line. These circuits range from simple transistor-diode circuits to microelectronic integrated circuits. Most recently telephones have become practical that employ the use of microprocessors. Such microprocessors may have a way to detect ringing signals for the purpose of powering up the circuitry to a ready state or provide for annunciation of the ringing signal. Any circuit that interfaces between the telephone line and the indication or annunciator circuit, such as a microprocessor controlled audio or visual signal, must meet certain requirements established by the Federal Communications Commission. These requirements cover ringing frequency, voltage, current, the impedance of the circuitry during ringing and the voice band impedance. Other factors also include such things as false triggering (the circuitry should not react to extension phone dial signals, etc.). Also, the interface should not fail under specified electrical surge conditions. A number of previously developed circuits often suffer from one problem or another such as sensitivity to dial signaling, requirement for a higher start-up voltage, lower impedance, etc. For example, circuits often reported in hobbyist publications do not really meet all requirements as listed by the Federal Communications Commission and should not be considered as valid approaches to the problem.

A number of integrated circuits have been developed which are able to power a transducer such as a piezoelectric ceramic disc or similar device, used to transform electrical energy into acoustical energy on a direct basis. These devices do not provide any optical isolation and accordingly they usually require a number of external components making the utilization high in cost for use as a visually or optically coupled interface. Transistor diode circuits are usually designed to transform low frequency ringing signals into a higher frequency audible signal and likewise do not provide a visual indication or optical isolation. Some ringing detection circuits maintain a low impedance during ringing or even when no ring is present, thereby excessively loading the telephone line causing poor alerting performance of other telephones that might be on the same line and in some instances even very poor audio characteristics.

Clearly, a need exists for ringing detection interface circuitry that does not excessively load the telephone line, does not react to other line transients such as dial signaling, optically isolates the line, withstands surges and meets all Federal Communications Commision requirements. Accordingly, it is the object of the present invention to outline a simple low cost circuit that may be used to optically isolate the telephone line from any ringing indication device or if necessary indicate ringing voltage directly with a visual indicator while meeting all telephone line interface requirements.

SUMMARY OF THE INVENTION

The circuitry of the present invention includes an input direct current blocking capacitor which presents a low impedance to the frequency range of ringing signals to be received over the telephone line. Coupled to the capacitor, which is connected to the telephone line, is a resistor in series with it which provides surge protection combination with a metallic oxide varistor which is connected across the two conductors of the telephone line. The resistor also provides a lower limit to the circuit impedance during the ringing or "on" state. Also connected in series with the aforementioned capacitor and resistor is a zener diode value which determines the basic voltage range for the turn-on threshold for the ring detector circuitry. This voltage is usually approximately 30 volts RMS. The zener diode also provides a high impedance to signal voltages that are below the avalanche turn-on threshold, thereby providing a high voice band impedance in accordance with Federal Communications Commission regulations. Continuing from the zener diode, a string of three general purpose silicon diodes connect the zener and the light emitting diode that's included in an optical coupler element and from there back to the other side of the telephone line, i.e. the common side of the circuit. The string of three diodes provides a relatively low forward impedance during the "on" state but a high impedance in the "off" state to further improve voice band impedance. A high value resistor bridges this diode string to adjust the "on" state impedance and provide a discharge path for the input capacitor. The light emitting diode that is included in the optical coupler is protected against negative voltage swings by a general purpose diode so connected as to shunt negative voltage pulses around the light emitting diode. A filter capacitor also is connected in shunt around the light emitting diode to provide a low impedance bypass for higher frequency transients not associated with ringing signals. This diode prevents false triggering during dial signaling etc. By proper choice of the component values involved, the circuitry can be made to respond to the normal ringing frequency and voltage ranges without special trimming and yet reject transients due to non-ringing signaling or operations.

In operation a ringing signal is detected on the telephone line by the turning on of the zener diode thus applying voltage to the light emitting diode included in the optical coupler. The light emitting diode flashes during the positive portion of incoming signals and will be seen to blink on and off at the lower frequencies or, appear to be steadily on at the high ringing frequencies. If an optical coupler is used, a series of pulses will be output from the optical coupler corresponding to each positive going portion of the ringing signal. These signals in turn are then applied to a ringing indication control circuit provided there is an audio or visual indication of the incoming ringing signal. The present circuitry is found to be extremely reliable functioning properly over a broad range of input voltages and frequencies. An important aspect of the invention is the inclusion of the string of three diodes which provides the low forward impedance during the ringing signal but provides a high blocking impedance during non-ringing signal conditions limited by the resistance in parallel with the string of diodes.

Another important aspect of the invention is the filtering action provided by a capacitor placed in parallel with the light emitting diode indicating device or the light emitting diode of the optical coupling device. This filtering action prevents any unwanted reaction to non-ringing type transients on the telephone line, such as dialing and hookswitch actuation. By adjustment of the capacitor value, the time constant of the circuit is adjusted to provide the desired sensitivity level of ringing signals to transient signals. For example, if desired the capacitor can be adjusted to eliminate reaction to dial pulses or not but still respond to the ringing signal. In some cases a desirable feature might also be to detect when another telephone of the same line is dialing for use in pulse dialing systems. In this instance the capacitor could be eliminated or adjusted to a lower value.

Finally, the input surge protective device and metallic oxide varistor, protects the circuitry from lightning surge and static discharge effects but does not respond to normal ring and dial voltage swings. The circuit is designed to include the capacitive effects of the metallic oxide varistor without failing on-hook voice band impedance limitations.

BRIEF DESCRIPTION OF THE DRAWING

The single sheet of accompanying drawings is a simplified schematic and block diagram of an optical coupling interface circuit for use of the telephone line to provide ringing signal indication or detection.

DESCRIPTION OF THE PREFERRED EMBODIMENT

Referring now to the accompanying drawing, the circuitry of the present invention is connected to telephone line terminals designated T and R. Connected across the T and R terminals is a metallic oxide varistor MOV which in combination with diode D4 provides surge protection for the circuitry. Connected to the T terminal is a capacitor C1 which functions to provide direct current blocking. Capacitor C1 in combination with a resistor in the same lead R1 also provides for impedance adjustment while zener diode CR1 serially connected with capacitor C1 and resistor R1 determines the voltage level for tripping or actuating of the circuitry of the present invention.

A string of diodes D1, D2 and D3 connected in series performs rectification and voice band impedance control while resistor R2 connected in parallel with diodes D1, D2 and D3 provides a discharge path for capacitor C1. Signals coupled over the T lead and through the previously outlined circuit path are then conducted to optical coupler OC and specifically to light emitting diode CR2 included therein. Optical coupler OC then provides the necessary optical coupling and isolation to associated ring indication control circuit 100, the details of which have not been disclosed in as much as they do not form a portion of the present invention. A ring indication control circuit provides audible or visual indication of ringing signals received over the telephone line and coupled to light emitting diode CR2 by means of the afore-mentioned circuitry. Shunting light emitting diode CR2 is capacitor C2 which also provides for transient filtering.

A further understanding of the present invention may be had by taking the following description of operation in connection with the accompanying drawing. As noted above, the circuit of the present invention is connected to the tip and ring connections of a telephone line at terminals T and R respectively. It should be noted that the remainder of the subscriber's telephone circuit, of which the present invention forms a portion, is not shown as much as it does not form a portion of the present invention. The details being well within the knowledge of those skilled in the art. Also not shown are possible additional circuits similar to that of the present invention which might be attached in parallel to the same telephone line, i.e. tip and ring connections. It should be noted that with the subject invention, it is possible to attach up to 10 similar circuits like that shown to a single subscriber's line, depending on how many other telephone instruments are attached to the line. Also not shown are other possible extension telephone instruments that might be attached to the line.

The subject invention does not interfere with the proper operation of other telephone instruments on the line as long as the other instruments are also in accordance with the Federal Communications Commission requirements.

The metallic oxide varistor MOV shunts out transient surges which exceed approximately 360 volts in amplitude. This voltage level is set to devoid interaction with a ringing signal of approximately 150 volts RMS with a 50 volt DC level also present. The capacitor C1 blocks direct current from entering the circuit but allows the low frequency ringing signal. Resistor R1 is of a value sufficiently high to provide a base level impedance for the circuit during ringing when zener diode CR1 has sufficient voltage developed across it to go into its zener operation mode, conducting current into the rest of the circuit (this is the "on" state).

As the voltage signal level received from the telephone central office over the telephone line drops below the zener diode CR1's threshold, it acts as an ordinary diode blocking positive going signals except for leakage due to its capacitance and reverse leakage current. Negative going signals are conducted in the forward induction mode zener but the high value of resistor R2 and diodes D1, D2 and D3, tend to block the negative going signals. Diodes D1, D2 and D3 will also present a high impedance to positive and negative signals which are below three junction potential values of the diodes employed, thereby presenting a high impedance to voice band signals, limited by the parallel value of resistor R2. Since resistor R2 is a relatively high resistance of typically 10,000 ohms or more, only a very small current will flow that is sufficient to turn on the light emitting diode CR2 but will also present a high impedance to the telephone line as it is in series with the off-state impedance of diode CR1 and the impedance of capacitor C1 and R1. In the ringing state or "on" state of diode CR1, diode D4 will shunt negative going signals greater than one volt around the light emitting diode to prevent reverse breakdown of the light emitting diode and possible damage to it. Capacitor C2 provides filtering for unwanted transients and high frequency signals, preventing false triggering of the light emitting diode CR2. Finally, light emitting diodes CR2 is used for optically coupling to an indication or control circuit 100 through included transistor Q1 which provides isolation of sensitive electronic circuitry from telephone line transients.

In summary the present circuitry provides a method of surge protection, DC blocking, impedance adjustment to requirements, trip level adjustment, rectification and voice band impedance control, a capacitor discharge path, transient filtering and visual indication or optical coupling and isolation. It should be noted that the details of the type of ring indication and control circuit used, in the event that optical coupling is employed, is not employed because this will vary greatly depending on the application and is not a part of the present invention. From the foregoing it will be obvious to those skilled in the art that numerous modifications may be made to the present disclosure without departing from the spirit of the present invention which shall be limited only by the scope of the claims appended hereto.

What is claimed:

1. Ringing signal detection means connected to a telephone line, said detection means comprising:

visual signal generating means connected to said telephone line by first and second circuit conductors, operated in response to receipt of ringing signals received over said telephone line via said circuit conductors to generate visual signals;

serially connected in said first circuit conductor between said telephone line and said visual signal generating means, direct current blocking means, operating threshold determining means and voice band impedance controlling means comprising a plurality of serially connected diodes included in said first circuit conductor between said threshold determining means and said visual signal generating means; and transient filtering means connected to said circuit conductors in parallel with said visual signal generating means.

2. Ringing signal detection means as claimed in claim 1, wherein: said direct current blocking means comprises a capacitor.

3. Ringing signal detection means as claimed in claim 2, wherein: there is further included a resistor serially connected between said capacitor and said threshold determining means, said resistor and capacitor in combination comprising impedance adjustment means.

4. Ringing signal detection means as claimed in claim 1, wherein: said transient filtering means comprises a capacitor.

5. Ringing signal detection means as claimed in claim 4, wherein: there is further included a resistor connected in shunt around said voice band impedance controlling means to provide a discharge path for said capacitor.

6. Ringing signal detection means as claimed in claim 1, wherein: there is further included first surge protection means connected to said telephone line and between said circuit conductors.

7. Ringing signal detection means as claimed in claim 6, wherein: said first surge protection means comprises a metallic oxide varistor.

8. Ringing signal detection means as claimed in claim 6, wherein: there is further included second surge protection means connected to said circuit conductors in parallel with said visual signal generating means.

9. Ringing signal detection means as claimed in claim 8, wherein: said second surge protection means comprises a diode.

* * * * *